(12) United States Patent
Smith et al.

(10) Patent No.: US 9,996,743 B2
(45) Date of Patent: Jun. 12, 2018

(54) METHODS, SYSTEMS, AND MEDIA FOR DETECTING GAZE LOCKING

(71) Applicant: The Trustees of Columbia University in the City of New York, New York, NY (US)

(72) Inventors: Brian Anthony Smith, Brentwood, NY (US); Qi Yin, New York, NY (US); Shree Kumar Nayar, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days. days.

(21) Appl. No.: 14/646,632

(22) PCT Filed: Nov. 26, 2013

(86) PCT No.: PCT/US2013/071981
§ 371 (c)(1),
(2) Date: May 21, 2015

(87) PCT Pub. No.: WO2014/085438
PCT Pub. Date: Jun. 5, 2014

(65) Prior Publication Data
US 2015/0302251 A1 Oct. 22, 2015

Related U.S. Application Data

(60) Provisional application No. 61/730,933, filed on Nov. 28, 2012.

(51) Int. Cl.
G06K 9/00 (2006.01)
G06K 9/46 (2006.01)
G06T 7/73 (2017.01)

(52) U.S. Cl.
CPC ....... *G06K 9/00604* (2013.01); *G06K 9/0061* (2013.01); *G06K 9/00248* (2013.01);
(Continued)

(58) Field of Classification Search
CPC .................... G06K 9/0061; G06T 2207/30201
See application file for complete search history.

(56) References Cited

U.S. PATENT DOCUMENTS 8,398,239 B2 3/2013 Horning et al.
8,885,882 B1* 11/2014 Yin ........................... G06F 3/00
382/103

(Continued)

OTHER PUBLICATIONS

Applied Science Laboratories, "Mobile Eye-XG", last accessed Feb. 3, 2015, pp. 1-2, available at: http://www.asleyetracking.com/Site/Products/MobileEyeXG/tabid/70/Default.aspx.

(Continued)

*Primary Examiner* — Oneal R Mistry
(74) *Attorney, Agent, or Firm* — Byrne Poh LLP (57) ABSTRACT

Methods, systems, and media for detecting gaze locking are provided. In some embodiments, methods for gaze locking are provided, the methods comprising: receiving an input image including a face; locating a pair of eyes in the face of the input image; generating a coordinate frame based on the pair of eyes; identifying an eye region in the coordinate frame; generating, using a hardware processor, a feature vector based on values of pixels in the eye region; and determining whether the face is gaze locking based on the feature vector.

30 Claims, 7 Drawing Sheets

(52) U.S. Cl.
CPC ......... *G06K 9/4604* (2013.01); *G06K 9/4671* (2013.01); *G06T 7/73* (2017.01); *G06T 2207/30201* (2013.01)

(56) References Cited

U.S. PATENT DOCUMENTS

| | | | |
|---|---|---|---|
| 2003/0169907 | A1 | 9/2003 | Edwards et al. |
| 2006/0110008 | A1 | 5/2006 | Vertegaal et al. |
| 2006/0239670 | A1* | 10/2006 | Cleveland .............. A61B 3/113 396/51 |
| 2010/0287053 | A1* | 11/2010 | Ganong ............ G06F 17/30247 705/14.66 |
| 2011/0123118 | A1 | 5/2011 | Nayar et al. |
| 2011/0228975 | A1* | 9/2011 | Hennessey ............. A61B 3/113 382/103 |
| 2011/0293189 | A1 | 12/2011 | Sun et al. |
| 2012/0033853 | A1* | 2/2012 | Kaneda .............. G06K 9/00221 382/103 |
| 2012/0147328 | A1* | 6/2012 | Yahav .................... A61B 3/113 351/210 |
| 2012/0189160 | A1* | 7/2012 | Kaneda ................. A61B 3/113 382/103 |

OTHER PUBLICATIONS

Argyle, M. and Dean, J., "Eye Contact, Distance, and Affiliation", In Sociometry, vol. 28, Sep. 1965, pp. 289-304.
Baluja, S. and Pomerleau, D., "Non-Intrusive Gaze Tracking Using Artificial Neural Networks", Technical Report, Carnegie Mellon University, Jan. 1994, pp. 1-16.
Beymer, D. and Flickner, M., "Eye Gaze Tracking Using an Active Stereo Head", In Proceedings of the Computer Society Conference on Computer Vision and Pattern Recognition (CVPR '03), Madison, WI, US, Jun. 16-22, 2003, pp. 451-458.
Blackwell, H.R., "Contrast Thresholds of the Human Eye", In Journal of the Optical Society of America, vol. 36, No. 11, Jul. 12, 1946, pp. 624-643.
Bolt, R.A., "Put-that-there: Voice and Gesture at the Graphics Interface", In Proceedings of the 7th Annual Conference on Computer Graphics and Interactive Techniques (SIGGRAPH '80), Seattle, WA, US, Jul. 14-18, 1980, pp. 262-270.
Chang, C. and Lin, C., "LIBSVM: A Library for Support Vector Machines", In ACM Transactions on Intelligent Systems and Technology, vol. 2, No. 3, Apr. 2011, pp. 1-39.
Colombo, C., et al., "Robust Tracking and Remapping of Eye Appearance with Passive Computer Vision", In ACM Transactions on Multimedia Computing, Communications, and Applications, vol. 3, No. 4, Dec. 2007, pp. 1-22.
Curcio, C.A., et al., "Human Photoreceptor Topography", In Journal of Comparative Neurology, vol. 292, No. 2, Feb. 22, 1990, pp. 497-523.
Duda, R., et al., "Pattern Classification", 2nd edition, John Wiley & Sons, (month unknown) 2001, pp. 1-738.
Grinbath, "Eyeguide Mobile Tracker", last accessed Feb. 3, 2015, pp. 1-7, available at: http://www.grinbath.com/content/grinbath_eg.
Hansen, D. and Ji, Q., "In the Eye of the Beholder: A Survey of Models for the Eyes and Gaze", In Pattern Analysis and Machine Intelligence, vol. 32, No. 3, Mar. 2010, pp. 478-500.
Hansen, D.W. and Pece, A.E.C., "Eye Tracking in the Wild", In Computer Vision and Image Understanding, vol. 98, No. 1, Apr. 2005, pp. 155-181.
International Search Report dated Aug. 18, 2014 in International Patent Application No. PCT/US2013/071981.
Ishikawa, T., et al., "Passive Driver Gaze Tracking with Active Appearance Models", In Proceedings of the 11th World Congress on Intelligent Transportation Systems, Nagoya, JP, Oct. 17-22, 2004, pp. 1-12.
Kendon., A., "Some Functions of Gaze Direction in Social Interaction", In Acta Psychologica, vol. 26, Feb. 1967, pp. 22-63.
Kiss, J., "Facebook Hits 1 Billion Users a Month", Oct. 4, 2012, pp. 1-2, available at: http://www.guardian.co.uk/technology/2012/oct/04/facebook-hits-billion-users-a-month.
McMurrough, C.D., et al., "An Eye Tracking Dataset for Point of Gaze Dectection", In Proceedings of the Symposium on Eye Tracking Research and Applications (ETRA '12), Santa Barbara, CA, US, Mar. 28-30, 2012, pp. 305-308.
Morimoto, C. and Mimica, M., "Eye Gaze Tracking Techniques for Interactive Applications", In Journal of Computer Vision and Image Understanding Special Issue on Eye Detection and Tracking, vol. 98, No. 1, Apr. 2005, pp. 4-24.
Morimoto, C.H., et al., "Detecting Eye Position and Gaze from a Single Camera and 2 Light Sources", In Proceedings of the International Conference on Pattern Recognition (ICPR '02), vol. 4, Quebec City, CA, Aug. 11-15, 2002, pp. 314-317.
Omron Global, "OKAO Vision", last accessed Sep. 17, 2014, pp. 1-2, available at: https://web.archive.org/web/20140917021831/http://www.omron.com/r_d/coretech/vision/okao.html.
Ponz, A., et al., "Dataset for the Evaluation of Eye Detector for Gaze Estimation", In Proceedings of the 2012 ACM Conference on Ubiquitous Computing (UbiComp '12), Pittsburgh, PA, US, Sep. 5-8, 2012, pp. 1-23.
Shell, J.S., et al., "ECSGlasses and EyePliances: Using Attention to Open Sociable Windows of Interaction", In Proceedings of the Symposium on Eye Tracking Research & Applications (ETRA '04), San Antonio, TX, US, Mar. 22-24, 2004, pp. 93-100.
Shih, S.W. and Liu, J., "A Novel Approach to 3-D Gaze Tracking Using Stereo Cameras," In Journal of IEEE Transactions on Systems, Man, and Cybernetics, Part B: Cybernetics, vol. 34, No. 1, Feb. 2004, pp. 234-245.
Smith, J.D., "ViewPointer: Lightweight Calibration-Free Eye Tracking for Ubiquitous Handsfree Deixis", In Proceedings the 18th Annual ACM Symposium on User Interface Software and Technology (UIST D5), Seattle, WA, US, Oct. 23-26, 2005, pp. 1-76.
Tan, K.H., et al., "Appearance-Based Eye Gaze Estimation", In Proceedings of the 6th IEEE Workshop on Applications of Computer Vision (WACV '02), Orlando, FL, US, Dec. 3-4, 2002, pp. 191-195.
Tobii, "Tobii Studio—Eye Tracking Software for Analysis", last accessed Feb. 3, 2015, pp. 1-12, available at: http://www.tobii.com/en/eye-tracking-research/global/products/software/tobii-studio-analysis-software/.
Turk, M. and Pentland, A., "Face Recognition Using Eigenfaces", In Proceedings of the IEEE Computer Society Conference on Computer Vision and Pattern Recognition (CVPR '91), Lahaina, HI, US, Jun. 3-6, 1991, pp. 586-591.
Umoove, "Umoove", last accessed Feb. 3, 2015, pp. 1-10, available at: http://www.umoove.me/.
Vertegaal, R., "Attentive User Interfaces", Communications of ACM, vol. 46, No. 3, Mar. 2003, pp. 31-33.
Vertegaal, R., and Shell, J., "Attentive User Interfaces: the Surveillance and Sousveillance of Gaze-Aware Objects", In Journal of Social Science Information, vol. 47, No. 3, (month unknown) 2008, pp. 275-298.
Vertegaal, R., et al., "Eye Gaze Patterns in Conversations: There is More to Conversational Agents than Meets the Eyes", In Proceedings of the Conference on Human Factors in Computing Systems, (CHI '01), Seattle, WA, US, Mar. 31-Apr. 5, 2001, pp. 1-8.
Weidenbacher, U., et al., "A Comprehensive Head Pose and Gaze Database", In Proceedings of IET Conference on Intelligent Environments (IE D7), Ulm, DE, Sep. 24-25, 2007, pp. 455-458.
Written Opinion dated Aug. 18, 2014 in International Patent Application No. PCT/US2013/071981.
Xuuk Inc., "Eyebox2", copyright 2010 (month unknown), pp. 1-2, available at: https://www.xuuk.com/images/eyebox2productspecs.pdf.
Zhai, S., et al., "Manual and Gaze Input Cascaded (MAGIC) Pointing", In Proceedings of the SIGCHI Conference on Human Factors in Computing Systems (CHI '99), Pittsburgh, PA, US, May 15-20, 1999, pp. 246-253.
Zhou, Z.H. and Geng, X., "Projection Functions for Eye Detection", In Pattern Recognition, vol. 37, No. 5, May 2004, pp. 1049-1056.

(56) References Cited

OTHER PUBLICATIONS

Cadavid, S. et al., "Automated Classification of Gaze Direction Using Spectral Regression and support Vector Machine", In Proceedings of the 3rd Internation Conference on Affective Computing and Intelligent Interaction and Workshops (ACII 2009), Amsterdam, Netherlands, Sep. 10-12, 2009, pp. 1-6.

Chen, M., "Leveraging the Asymmetric Sensitivity of Eye Contact for Video Conferencing", In Proceedings of SIGCHI Conference on Human Factors in Computing Systems, Minneapolis, MN, US, Apr. 20-25, 2002, pp. 49-56.

Cline, M.G., "The Perception of Where a Person is Looking", In American Journal of Psychology, vol. 08, No. 1, Mar. 1967, pp. 41-50.

EyeTech VT2 XL, available at https://web.archive.org/web/20150212063733/http://www.eyetechds.com/v12-xl.shtml, captured on Feb. 12, 2015, pp. 1-2.

Gamer, M. et al., "Are You Looking At Me? Measuring the Cone of Gaze", In Journal of Experimental Psychology, Human Perception and Performance, vol. 33, No. 3, Jun. 2007, pp. 705-715.

Gemmell, J. et al., "Gaze Awareness for Video Conferencing: A Software Approach", In Journal of IEEE Multimedia, vol. 7, No. 04, Oct. 2000, pp. 26-35.

Gibson, J.J. et al., "Perception of Another Person's Looking Behavior", In American Journal of Psychology, vol. 76, No. 03, Sep. 1963, pp. 386-394.

Lu, F. et al., "Inferring Human Gaze from Appearance via Adaptive Linear Regression", In Proceedings of IEEE International Conference on Computer Vision (ICCV '11), Barcelona, Spain, Nov. 6, 2011, pp. 153-160.

Martin, W.W. et al., "The Accuracy of Eye-Gaze Judgement: A Signal Detection Approach", In the British Journal of Social Psychology, vol. 21, No. 4, Nov. 1982, pp. 293-299.

Matthews, B., "Comparison of the Predicted and Observed Secondary Structure of T4 Phage Lysozyme", In Biochimica Et Biophysica Acta., vol. 405, No. 2, Oct. 20, 1975, pp. 442-451.

Mora, K.A.F. et al., "Gaze Estimation from Multimodal Kinect Data", In Proceedings of IEEE Computer Society Conference on Computer Vision and Pattern Recognition Workshops (CVPRW 12), Providence, RI, US, Jun. 16, 2012, pp. 25-30.

Morimoto, C. et al., "Pupil Detection and Tracking Using Multiple Light Sources", In Journal of Image and Vision Computing, vol. 18, No. 04, Mar. 2000, pp. 331-335.

Nishino, K. et al., "The World in an Eye", In Proceedings of Computer Society Conference on Computer Vision and Pattern Recognition (CVPR 2004), Jul. 2-27, 2004, Washington DC, US, pp. 444-451.

Shectman, D. et al., "Maximum Angle of Ocular Duction During Visual Fixation as a Function of Age", In Strabismus, vol. 13, No. 01, Mar. 2005, pp. 21-26.

Stiefelhagen, R. et al., "A Model-Based Gaze Tracking System", In Proceedings of the International Joint Symposia on Intelligence and Systems (IJSIS '96), Rockville, MD, US, Nov. 4-5, 1996, pp. 304-310.

Stiefelhagen, R. et al., "Tracking Eyes and Monitoring Eye Gaze", In Proceedings of Perceptual User Interfaces Workshop (PUI 1997), Banff, Alberta, CA, Oct. 20-21, 1997, pp. 1-3.

Supplementary European Search Report dated Aug. 17, 2016 in European Patent Application No. 13858128.5.

Symons, L.A. et al., "What Are You Looking At? Acuity for Triadic Eye Gaze", In Journal of General Psychology, vol. 131, No. 4, Oct. 2004, pp. 451-469.

Ye, Z. et al., "Detecting Eye Contact Using Wearable Eye-Tracking Glasses", In Proceedings of the 2012 ACM Conference on Ubiquitous Computing, Pittsburgh, Pennsylvania, US, Sep. 5-8, 2012, pp. 699-704.

\* cited by examiner

METHODS, SYSTEMS, AND MEDIA FOR DETECTING GAZE LOCKING

CROSS REFERENCE TO RELATED APPLICATION

This application claims the benefit of U.S. Provisional Patent Application No. 61/730,933, filed Nov. 28, 2012, which is hereby incorporated by reference herein in its entirety.

STATEMENT REGARDING FEDERALLY SPONSORED RESEARCH OR DEVELOPMENT

The invention was made with government support under Grant No. N00014-11-1-0285 awarded by Department of Defense (DoD). The government has certain rights in the invention.

TECHNICAL FIELD

Methods, systems, and media for detecting gaze locking are provided. More particularly, the disclosed subject matter relates to detecting gaze locking.

BACKGROUND

Eye contact is a major form of nonverbal communication and plays a crucial role in our everyday social interactions. While a person may have a difficult time determining the exact angle at which someone else is looking (e.g., a gaze direction), the person can determine whether another person is looking at him and interact with other people via eye contact. Similarly, a device can implement powerful human-object interfaces if it can sense a user's attention via eye contact (e.g., determining whether a user is looking at it). Unfortunately, conventional approaches do not provide mechanisms for directly sensing eye contact.

SUMMARY

Methods, systems, and media for detecting gaze locking are provided. In some embodiments, methods for gaze locking are provided, the methods comprising: receiving an input image including a face; locating a pair of eyes in the face of the input image; generating a coordinate frame based on the pair of eyes; identifying an eye region in the coordinate frame; generating, using a hardware processor, a feature vector based on values of pixels in the eye region; and determining whether the face is gaze locking based on the feature vector.

In some embodiments, systems for detecting gaze locking are provided, the systems comprising: at least one hardware processor that is configured to: receive an input image including a face; locate a pair of eyes in the face of the input image; generate a coordinate frame based on the pair of eyes; identify an eye region in the coordinate frame; generate a feature vector based on values of pixels in the eye region; and determine whether the face is gaze locking based on the feature vector.

In some embodiments, non-transitory media containing computer-executable instructions that, when executed by a processor, cause the processor to perform a method for detecting gaze locking are provided, the method comprising: receiving an input image including a face; locating a pair of eyes in the face of the input image; generating a coordinate frame based on the pair of eyes; identifying an eye region in the coordinate frame; generating a feature vector based on values of pixels in the eye region; and determining whether the face is gaze locking based on the feature vector.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, as described in more detail below, mechanisms, which can include systems, methods, and computer-readable media, for detecting gaze locking are provided.

In some embodiments, the mechanisms can sense eye contact from an image (e.g., an image downloaded from the Internet, an image captured by a camera, and/or any other suitable image including one or more faces) using a gaze locking detector. For example, the gaze locking detector can analyze the image and output a binary decision indicating whether each face in the image is gaze locking or not (e.g., whether each person in the image was making direct eye contact with a point or area of space). In a more particular example, the gaze locking detector can detect a pair of eyes in the image, extract features of the detected eyes (e.g., intensity values of the pixels within a portion of the image including the detected eyes), and determine whether the detected eyes are gaze locking or not based on the extracted features using a suitable classifier (e.g., a support vector machine or any other suitable classifier that is capable of making a binary decision).

The mechanisms can perform a variety of functions. For example, the mechanisms can facilitate human-object interactions by detecting a user's attention using a gaze locking detector. In a more particular example, the mechanisms can detect that a user is looking at a computing device using the gaze locking detector. The mechanisms can then cause an application (e.g., a Web browser, a media player, and/or any other suitable application that can run on the computing device) to be launched on the computing device.

As another example, the mechanisms can sort and filter images (e.g., such as images available on the Internet) by degree of eye contact (e.g., the number of faces that are gaze locking on a given image) and can enable image search based on degree of eye contact.

As yet another example, the mechanisms can take a picture of a group of people using a gaze trigger function. In a more particular example, in response to a user (e.g., a photographer) initiating the gaze trigger function, the mechanisms can wait for the user to enter into the field of view of a camera. Upon detecting the presence of the user within the field of view of the camera (e.g., using a suitable face detection algorithm), the mechanisms can instruct the camera to take a picture of a group of people when a gaze locking detector determines that each member of the group is looking at the camera.

Figure 1:
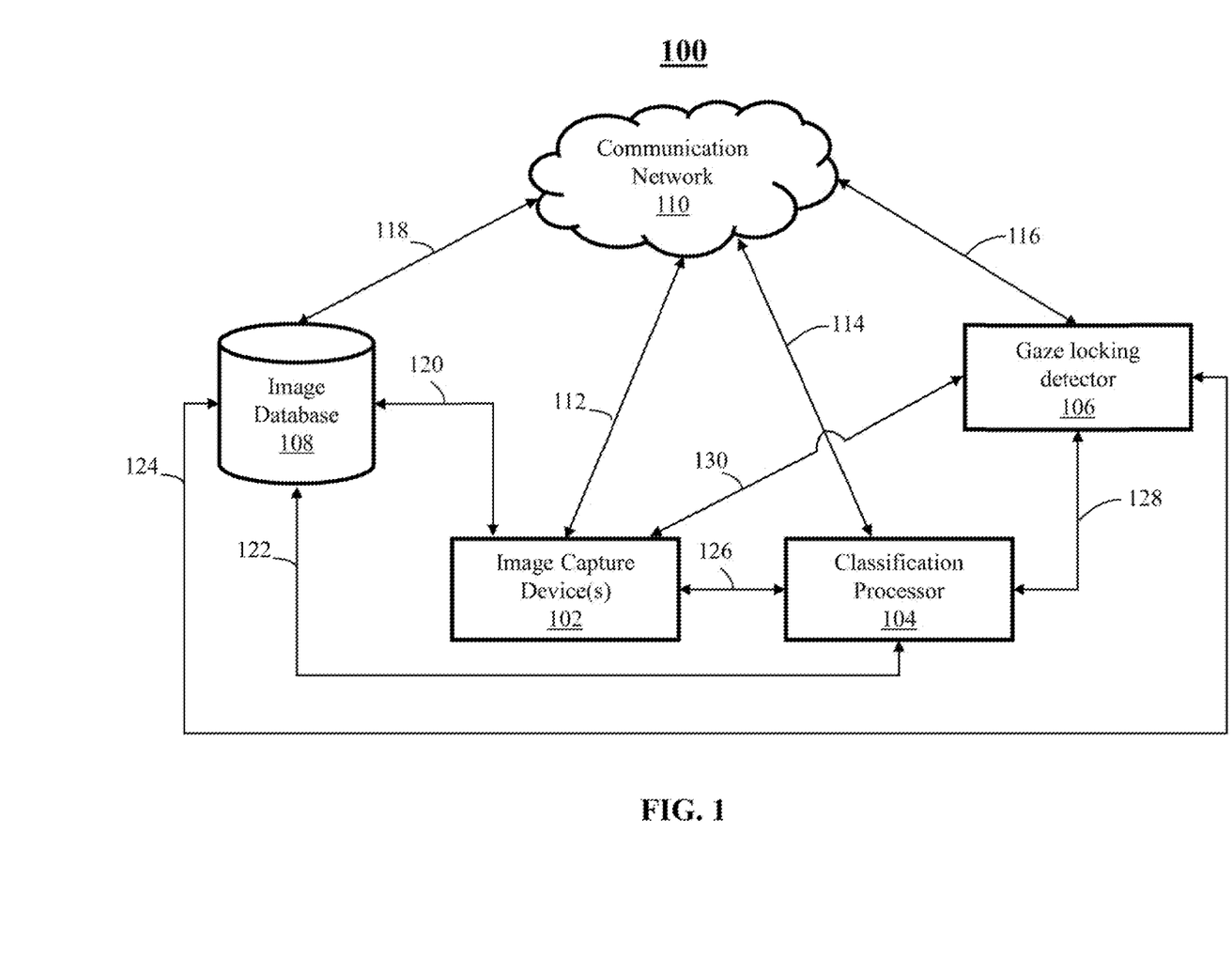
FIG. 1 shows a generalized block diagram of an example of a system for detecting gaze locking in accordance with some embodiments of the disclosed subject matter.

Turning to FIG. 1, an example 100 of a system for detecting gaze locking in accordance with some embodiments of the disclosed subject matter is shown.

As illustrated, system 100 can include one or more image capture device(s) 102, a classification processor 104, a gaze locking detector 106, an image database 108, a communication network 110, communication links 112, 114, 116, 118, 120, 122, 124, 126, 128, and 130, and/or any other suitable components.

Image capture device(s) 102 can be any suitable device that is capable of capturing images, such as a camera, a video recorder, a scanner, a mobile telephone, a tablet computing device, a wearable computing device, and/or any other suitable device that can capture, detect, and/or process images.

In some embodiments, image capture device(s) 102 can capture a set of training images to provide training gaze data for classification processor 104 and/or gaze locking detector 106. For example, the training images may include multiple sets of face images of multiple people over a set of head poses and a set of gaze directions.

Figure 2:
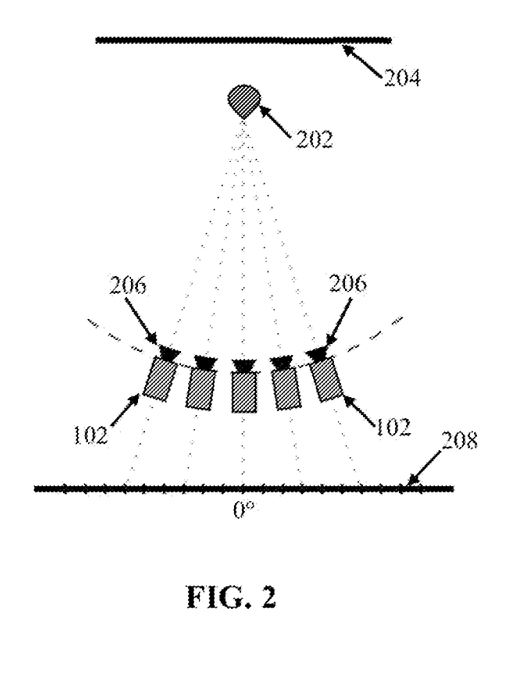
FIG. 2 shows a diagram of an example of a system for creating training gaze data in accordance with some embodiments of the disclosed subject matter.

In a more particular example, as shown in FIG. 2, for a given subject 202, image capture device(s) 102 can capture a set of face images of the subject for each combination of a set of head poses, a set of horizontal gaze directions, and a set of vertical gaze directions.

As illustrated, subject 202 can be seated in front of a background 204 (e.g., a black background) and can look at a wall 208. In some embodiments, one or more image capture devices 102 can capture multiple sets of images of subject 202 from a set of camera positions 206. The set of camera positions 206 can be placed in any suitable manner to represent a set of head poses of subject 202 (e.g., −30 degrees, −15 degrees, 0 degree, 15 degrees, 30 degrees, and/or any other suitable head poses). For example, the set of camera positions 206 may be placed at the same distance from subject 202. In some embodiments, multiple sets of images of subject 202 may be captured from multiple camera positions 206 asynchronously.

In some embodiments, when placed in a particular camera position 206, an image capture device 102 can capture a set of face images of subject 202 corresponding to a set of gaze directions. For example, image capture device 102 can be placed at eye height and can capture a set of images of subject 202 when subject 202 is gazing at a portion of wall 208 (e.g., in a raster scan fashion). In a more particular example, the set of gaze directions may include any suitable combinations of a set of horizontal gaze directions (e.g., −15 degrees, −10 degrees, −5 degrees, 0 degree, 5 degrees, 10 degrees, 15 degrees, and/or any suitable horizontal gaze directions) and a set of vertical gaze directions (e.g., −10 degrees, 0 degree, 10 degrees, and/or any suitable vertical gaze directions). In another more particular example, the set of gaze directions can include a gaze locking direction (e.g., a combination of a zero degree horizontal gaze direction and a zero degree vertical gaze direction).

Referring back to FIG. 1, classification processor 104 can be any suitable device that is capable of receiving or creating training gaze data, classifying training gaze data, training classifiers using training gaze data, and/or performing any other suitable functions.

In some embodiments, classification processor 104 can receive a set of training images generated by image capture device(s) 102 and process the training images to create training gaze data. For example, classification processor 104 can perform face detection on the training images and locate the eyes in the training images. In a more particular example, the OKAO VISION face detector produced by OMRON CORPORATION of Kyoto, Japan can be used to perform face detection on a training image and identify the inside and outside corners of each eye of a detected face in the training image.

Figure 5:
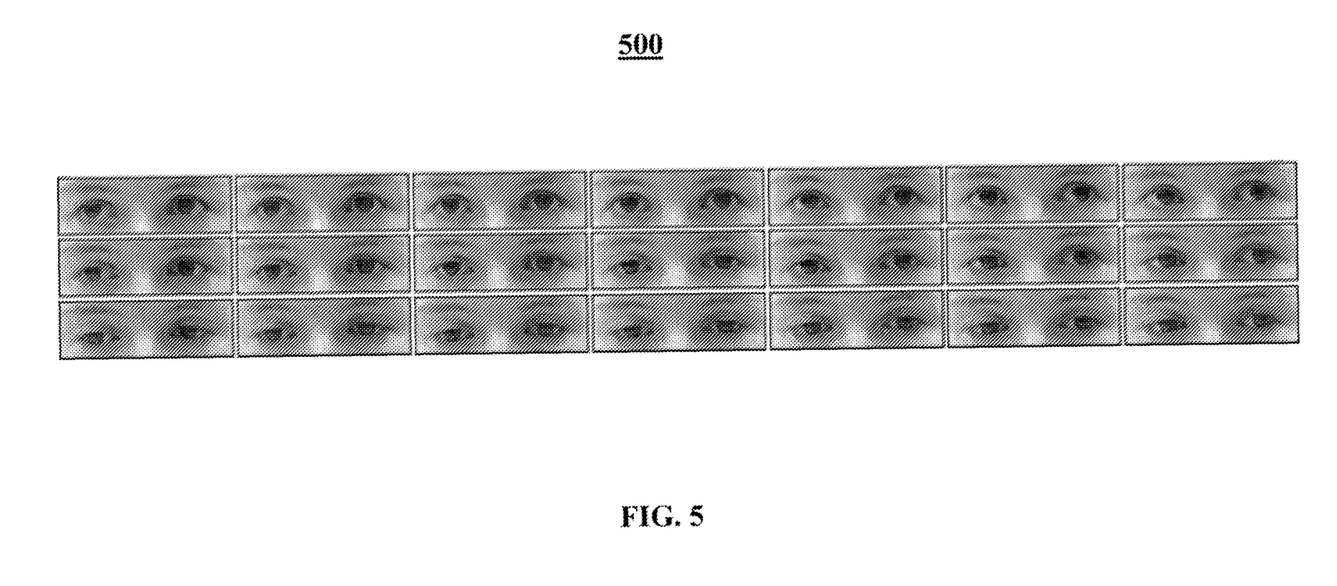
FIG. 5 shows an example of a set of gaze data that can be used to train a gaze locking detector in accordance with some embodiments of the disclosed subject matter.

In some embodiments, upon locating the eyes in a given training image, classification processor 104 can extract gaze data including the detected eyes from the training image by cropping the training image. In a more particular example, as shown in FIG. 5, a set of training gaze data can be generated based on a set of training images that correspond to various head poses, horizontal gaze directions, and/or vertical gaze direction of one or more subjects.

In some embodiments, classification processor 104 can generate additional gaze data by performing random perturbation on the training gaze data (e.g., by making random adjustments to the resolution of the training images and/or the detected eye corner positions).

In some embodiments, classification processor 104 can classify the training gaze data into a set of classes in some embodiments. For example, the training gaze data can be classified into "gaze-locking" images and "non-gaze-locking" images. In a more particular example, a "gaze-locking" image may correspond to any suitable head pose and a gaze-locking direction, such as a combination of a zero degree horizontal gaze direction and a zero degree vertical gaze direction.

As another example, each of the set of classes may correspond to a particular gaze direction. In a more particular example, the training gaze data can be classified based on a set of horizontal gaze directions (e.g., −15 degrees, −10 degrees, −5 degrees, 0 degree, 5 degrees, 10 degrees, 15 degrees, and/or any other suitable gaze directions). In such an example, one of the set of classes can correspond to a gaze-locking direction (e.g., a zero degree horizontal direction) while the other classes correspond to a set of non-gaze-locking directions (e.g., 15 degrees, −10 degrees, −5 degrees, 5 degrees, 10 degrees, 15 degrees, and/or any other suitable gaze directions).

In some embodiments, classification processor 104 can train one or more classifiers using the training gaze data. Examples of a classifier include a support vector machine (SVM), a linear discriminant analysis (LDA) classifier, a neural network, a principal component analysis (PCA) classifier, and/or any other suitable classifier that can be used to determine whether a detected face is gaze locking. In a more particular example, an SVM can be trained based on the training gaze data using the LibSVM library from Chang, C., Lin, C., "LIBSVM: A library for support vector machines," 2001, ACM TIST, which is hereby incorporated by reference herein in its entirety.

In another more particular example, classification processor 104 can perform a principal component analysis (PCA) on the training gaze data to find a basis set of images that can represent features of the training gaze data.

Gaze locking detector 106 can be any suitable device that is capable of receiving images, processing images, determine whether a face in an image is gaze locking or not, and/or performing other suitable functions. In some embodiments, as further described hereinbelow in connection with FIGS. 3 and 4, gaze locking detector 108 can sense eye contact by implementing one or more suitable portions of process 300 and/or process 400.

Image database 108 can be any suitable device that is capable of storing images, image-related data, training gaze data, and/or any other suitable data, such as memory, a disk drive, a network drive, a database, a server, and/or any other suitable storage device.

In some embodiments, each of image capture device(s) 102, classification processor 104, gaze locking detector 106, and image database 108 can include and/or be any of a general purpose device such as a computer or a special purpose device such as a client, a server, and/or any other suitable device. Any of these general or special purpose devices can include any suitable components such as a hardware processor (which can be a microprocessor, digital signal processor, a controller, and/or any other suitable hardware processor.), memory, communication interfaces, display controllers, input devices, and/or any other suitable components. For example, each of image capture device(s) 102, classification processor 104, gaze locking detector 106, and image database 108 can be implemented as or include a personal computer, a tablet computer, a wearable computer, a multimedia terminal, a mobile telephone, a gaming device, a set-top box, a television, and/or any other suitable device. Moreover, each of image capture device(s) 102, classification processor 104, gaze locking detector 106, and image database 108 can comprise a storage device, which can include a hard drive, a solid state storage device, a removable storage device, and/or any other suitable storage device. Each of image capture device(s) 102, classification processor 104, gaze locking detector 106, and image database 108 can be located at any suitable location. Each of image capture device(s) 102, classification processor 104, gaze locking detector 106, and image database 108 can be implemented as a stand-alone device or integrated with other components of system 100.

Communication network 110 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

In some embodiments, communication network 110 can be connected to image capture device(s) 102, classification processor 104, gaze locking detector 106, and image database 108 through communication links 112, 114, 116, and 118, respectively. Image database 108 can be connected to image capture device(s) 102, classification processor 104, and gaze locking detector 106 through communication links 120, 122, and 124, respectively. Classification processor 104 can be connected to image capture device(s) 102 and gaze locking detector 106 through communication links 126 and 128, respectively. Image capture device(s) 102 can be connected to gaze locking detector 106 through communication link 130.

Communication links 112, 114, 116, 118, 120, 122, 124, 126, 128, and 130 can be any suitable communication links, such as network links, dial-up links, wireless links, hard-wired links, any other suitable communication links, or a combination of such links.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 3:
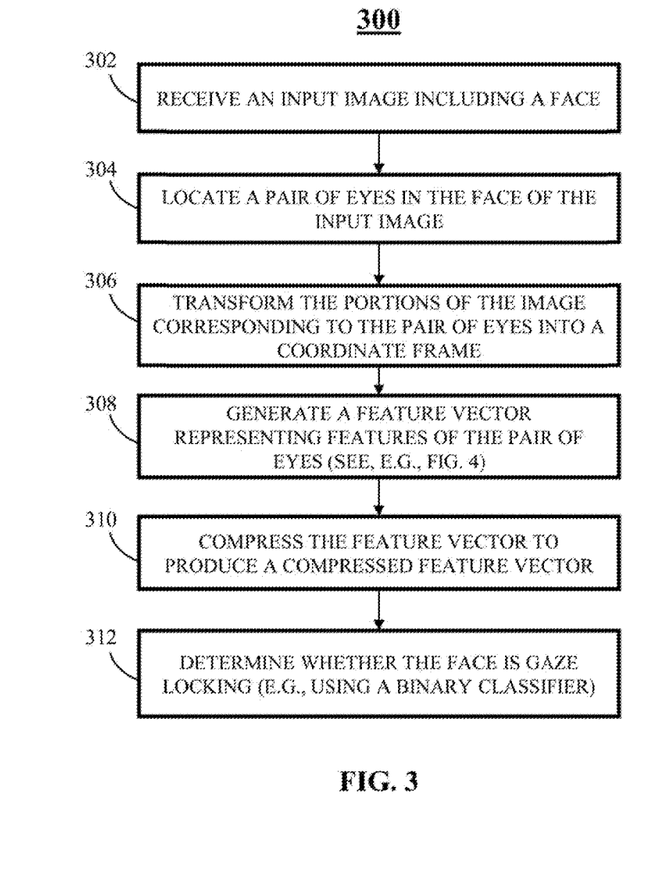
FIG. 3 shows a flow chart of an example of a process for detecting gaze locking in accordance with some embodiments of the disclosed subject matter.

Turning to FIG. 3, a flow chart of an example 300 of a process for detecting gaze locking in accordance with some embodiments of the disclosed subject matter is shown. In some embodiments, process 300 can be implemented by a gaze locking detector comprising a hardware processor, such as gaze locking detector 106 as described in connection with FIG. 1.

As illustrated, process 300 can start by receiving an input image including a face at 302. This input image can be provided from any suitable source. For example, the input image can be provided from image storage media (e.g., a memory device, a disk drive, and/or any other storage media that is capable of storing images), can be provided from an interface (e.g., from a computer network such as the Internet), can be provided from a local image source (e.g., from an image capture device), and/or can be provided from any other suitable source.

Figure 6:
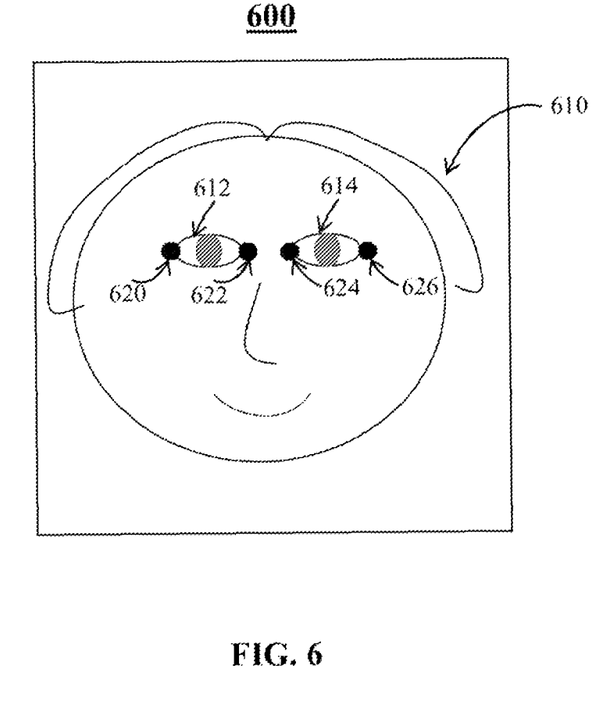
FIG. 6 shows an example of a detected face showing fiducial points in accordance with some embodiments of the disclosed subject matter.

Next, at 304, process 300 can locate a pair of eyes in the face of the input image. The eyes can be located using any suitable mechanism. For example, the locations of the eyes in the input image can be identified using the OKAO VISION face detector produced by OMRON CORPORATION of Kyoto, Japan. In a more particular example, as shown in FIG. 6, the face detector can identify a face 610 and a set of fiducial points 620, 622, 624, and 626 in an input image 600. As illustrated, these fiducial points can identify the locations of the inside and outside corners of an eye 612 and an eye 614 in face 610.

Referring back to FIG. 3, process 300 can transform the portions of the image corresponding to the pair of eyes into a coordinate frame at 306. The coordinate frame can be generated in any suitable manner. For example, process 100 can rectify each portion of the image corresponding to the pair of eyes and can then combine the rectified portions of the image to form the coordinate frame. In a more particular example, process 300 can apply an affine transformation to each portion of the image corresponding to the pair of eyes so that the images of the eyes are aligned to a coordinate system, and produce two frames, each of which can include a rectified portion of the image (e.g., a frame having 48×36 pixels or any other suitable resolution). Process 300 can then concatenate the two frames to produce a coordinate frame including a pair of rectified portions of the image (e.g., an image having 96×36 pixels or any other suitable resolution).

At 308, process 300 can generate a feature vector representing features of the pair of eyes. The feature vector can be generated in any suitable manner. For example, process 300 can identify a portion of the coordinate frame including the pair of rectified portions of the image (e.g., an eye region). Process 300 can then extract features of the pixels in the eye region (e.g., the intensity values of the pixels) and generate a feature vector based on the extracted features. In a more particular example, as described hereinbelow in connection with FIG. 4, the gaze locking detector can locate an eye region in the coordinate frame by applying a mask to the coordinate frame and can concentrate intensity values of the pixels in the eye region into a feature vector.

In some embodiments, at 310, process 300 can compress the feature vector to produce a compressed feature vector. The compression can be performed in any suitable manner. For example, a feature vector (e.g., an M dimensional vector) can be projected onto a lower-dimensional space (e.g., an N dimensional space, where N<M) using any suitable dimensionality reduction techniques. In a more particular example, a lower-dimensional space can be defined by performing a principal component analysis (PCA) on a set of training images (e.g., a set of training gaze data as described in connection with FIG. 1).

Additionally or alternatively, a feature vector (e.g., a feature vector obtained at 308 or a projected feature vector generated based on PCA) can be projected onto a lower-dimensional space by employing multiple discriminant analysis (MDA). For example, a feature vector can be projected onto a (c−1)-dimensional space to be assigned to one of c classes. The value of "c" can be selected in any suitable manner (e.g., through simulations). In some embodiments in which a set of training gaze data can be classified based on a set of gaze directions as described in connection with FIG. 1, the value of "c" can correspond to the number of the gaze directions. In a more particular example, in some embodiments in which a set of training gaze data can be classified into seven classes based on their corresponding horizontal gaze directions (e.g., −15 degrees, −10 degrees, −5 degrees, 0 degree, 5 degrees, 10 degrees, and 15 degrees), the feature vector can be projected onto a 6-dimensional space.

Next, at 312, process 300 can determine whether the face is gaze locking. This determination can be made in any suitable manner. For example, a suitable classifier can be used to assign the compressed feature vector to one of two classes (e.g., "locking" or "not locking"). In a more particular example, the classifier can be a support vector machine (SVM), a linear discriminate analysis (LDA) classifier, a neural network, and/or any other suitable classifier that is capable of making a binary decision.

Figure 4:
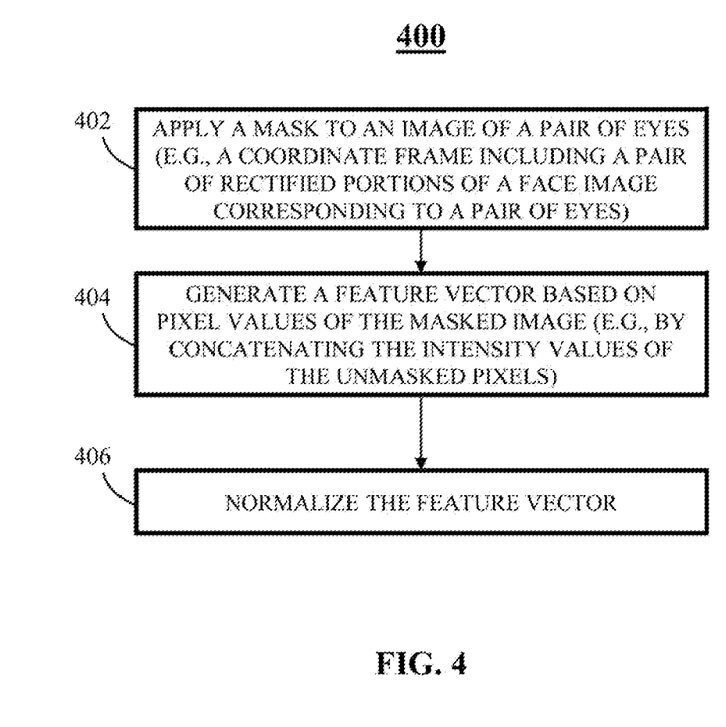
FIG. 4 shows a flow chart of an example of a process for generating a feature vector to detect gaze locking in accordance with some embodiments of the disclosed subject matter.

Turning to FIG. 4, an example 400 of a process for generating a feature vector representing features of a pair of eyes in some embodiments of the disclosed subject matter is shown. In some embodiments, process 400 can be implemented by a gaze locking detector comprising a hardware processor, such as gaze locking detector 106 as described in connection with FIG. 1.

As shown, process 400 can start by applying a mask to an image of a pair of eyes at 402. In some embodiments, the image can be a coordinate frame including a pair of rectified portions of a face image corresponding to a pair of eyes as described in connection with FIG. 3 above. Any suitable mask can be used to define a portion of the image that contains the pair of eyes (e.g., an eye region). For example, the mask can have any suitable shapes, such as rectangle, circle, ellipse, and/or any other suitable shape that can be used to identify an eye region in an image. As another example, the size and/or position of the mask can be determined based on the locations of the pair of eyes.

Figure 7:
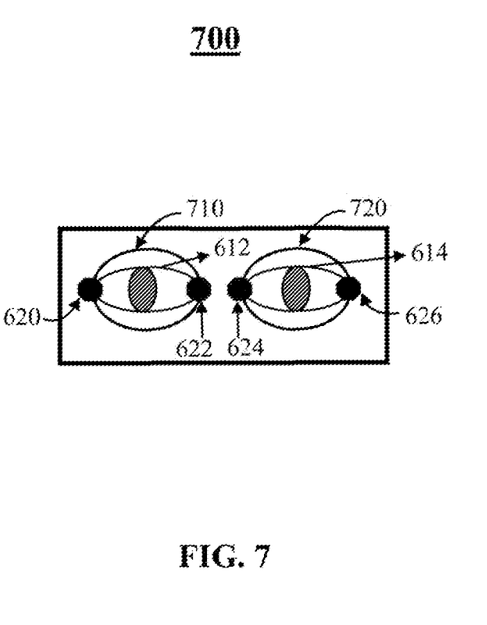
FIG. 7 shows an example of a coordinate frame including a pair of eyes showing a mask in accordance with some embodiments of the disclosed subject matter.

In a more particular example, as shown in FIG. 7, an elliptical mask 710 and an elliptical mask 720 can be applied to an eye 612 and an eye 614 in a coordinate frame 700, respectively. As described in connection with FIG. 6, a set of fiducial points 620, 622, 624, and 626 can define the locations of the inside and outside corners of eye 612 and eye 614.

In some embodiments, the major axis of elliptical mask 710 can be positioned on the line segment connecting fiduciary points 622 and 620 that define the inside and outside corners of eye 612. Similarly, the major axis of elliptical mask 720 can be positioned on the line segment connecting fiduciary points 624 and 626 that define the inside and outside corners of eye 614.

In some embodiments, each of elliptical masks 710 and 720 can have any suitable size. For example, a relatively large ellipse may be used to preserve more information about pixels outside of eye 612 and eye 614 and more information about gaze directions of eye 612 and eye 614. As another example, a relatively small ellipse may be more robust to noise from the pixels surrounding eye 612 and/or eye 614. In some embodiments, a brute-force search can be performed to search for suitable major and minor axis lengths for mask 710 and/or mask 720. In some embodiments, the brute-force search can be performed based on a set of training data (e.g., a set of training gaze data as described above in connection with FIG. 1).

Referring back to FIG. 4, at 404, process 400 can generate a feature vector based on the pixels of the masked image. In a more particular example, process 400 can concatenate the values of the unmasked pixels (e.g., intensity values of the pixels within masks 710 and 720 of FIG. 7) into a feature vector.

In some embodiments, process 400 can normalize the feature vector at 406. Any suitable normalization can be used. For example, a unit-magnitude feature factor can be generated by normalizing the feature vector to a suitable unit magnitude.

It should be noted that the above steps of the flow diagrams of FIGS. 3-4 can be executed or performed in any order or sequence not limited to the order and sequence shown and described in the figure. Also, some of the above steps of the flow diagrams of FIGS. 3-4 can be executed or performed substantially simultaneously where appropriate or in parallel to reduce latency and processing times. Furthermore, it should be noted that FIGS. 3-4 are provided as examples only. At least some of the steps shown in these figures may be performed in a different order than represented, performed concurrently, or altogether omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for detecting gaze locking are provided.

Although the disclosed subject matter has been described and illustrated in the foregoing illustrative embodiments, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed embodiments can be combined and rearranged in various ways.

What is claimed is:

1. A method for detecting gaze locking, the method comprising:
   receiving an input image including a face;
   locating a pair of eyes in the face of the input image;
   generating a first coordinate frame based on one of the pair of eyes and generating a second coordinate frame based on another of the pair of eyes;
   concatenating the first coordinate frame and the second coordinate frame to produce a concatenated coordinate frame;
   identifying an eye region in the concatenated coordinate frame;
   generating, using a hardware processor, a feature vector by concatenating values of pixels in the eye region; and
   determining, based on the feature vector, whether the face is gaze locking.

2. The method of claim 1, further comprising:
   identifying a set of fiducial points in the input image; and
   locating the pair of eyes in the input image based on the set of fiducial points.

3. The method of claim 2, further comprising identifying the eye region in the concatenated coordinate frame based on the set of fiducial points.

4. The method of claim 1, further comprising applying a first affine transformation to a portion of the input image corresponding to the pair of eyes to produce the first coordinate frame.

5. The method of claim 1, further comprising concatenating intensity values of the pixels in the eye region to produce the feature vector.

6. The method of claim 1, further comprising applying a mask to the concatenated coordinate frame to produce a masked image.

7. The method of claim 6, further comprising identifying the eye region based on the masked image.

8. The method of claim 6, further comprising:
   concatenating intensity values of pixels in the masked image to produce the feature vector;
   normalizing the feature vector to produce a normalized feature vector; and
   determining whether the face is gaze locking based on the normalized feature vector.

9. The method of claim 1, further comprising:
   compressing the feature vector to generate a compressed feature vector; and
   determining, based on the compressed feature vector, whether the face is gaze locking using a classifier.

10. The method of claim 9, wherein the classifier is a binary classifier.

11. A system for detecting gaze locking, the system comprising:
   at least one hardware processor that is configured to:
   receive an input image including a face;
   locate a pair of eyes in the face of the input image;
   generate a first coordinate frame based on one of the pair of eyes and generate a second coordinate frame based on another of the pair of eyes;
   concatenate the first coordinate frame and the second coordinate frame to produce a concatenated coordinate frame;
   identify an eye region in the concatenated coordinate frame;
   generate a feature vector by concatenating values of pixels in the eye region; and
   determine, based on the feature vector, whether the face is gaze locking.

12. The system of claim 11, wherein the hardware processor is further configured to:
   identify a set of fiducial points in the input image; and
   locate the pair of eyes in the input image based on the set of fiducial points.

13. The system of claim 12, wherein the hardware processor is further configured to identify the eye region in the concatenated coordinate frame based on the set of fiducial points.

14. The system of claim 11, wherein the hardware processor is further configured to apply a first affine transformation to a portion of the input image corresponding to the pair of eyes to produce the first coordinate frame.

15. The system of claim 11, wherein the hardware processor is further configured to concatenate intensity values of the pixels in the eye region to produce the feature vector.

16. The system of claim 11, wherein the hardware processor is further configured to apply a mask to the concatenated coordinate frame to produce a masked image.

17. The system of claim 16, wherein the hardware processor is further configured to identify the eye region based on the masked image.

18. The system of claim 16, wherein the hardware processor is further configured to:
   concatenate intensity values of pixels in the masked image to produce the feature vector;
   normalize the feature vector to produce a normalized feature vector; and
   determine whether the face is gaze locking based on the normalized feature vector.

19. The system of claim 11, wherein the hardware processor is further configured to:
   compress the feature vector to generate a compressed feature vector; and
   determine, based on the compressed feature vector, whether the face is gaze locking using a classifier.

20. The system of claim 19, wherein the classifier is a binary classifier.

21. A non-transitory computer-readable medium containing computer-executable instructions that, when executed by a processor, cause the processor to perform a method for detecting gaze locking, the method comprising:
   receiving an input image including a face;
   locating a pair of eyes in the face of the input image;
   generating a first coordinate frame based on one of the pair of eyes and generating a second coordinate frame based on another of the pair of eyes;
   concatenating the first coordinate frame and the second coordinate frame to produce a concatenated coordinate frame;
   identifying an eye region in the concatenated coordinate frame;
   generating a feature vector by concatenating values of pixels in the eye region; and
   determining, based on the feature vector, whether the face is gaze locking.

22. The non-transitory computer-readable medium of claim 21, wherein the method further comprises:

identifying a set of fiducial points in the input image; and
locating the pair of eyes in the input image based on the set of fiducial points.

23. The non-transitory computer-readable medium of claim 22, wherein the method further comprises identifying the eye region in the concatenated coordinate frame based on the set of fiducial points.

24. The non-transitory computer-readable medium of claim 21, wherein the method further comprises applying a first affine transformation to a portion of the input image corresponding to the pair of eyes to produce the first coordinate frame.

25. The non-transitory computer-readable medium of claim 21, wherein the method further comprises concatenating intensity values of the pixels in the eye region to produce the feature vector.

26. The non-transitory computer-readable medium of claim 21, wherein the method further comprises applying a mask to the concatenated coordinate frame to produce a masked image.

27. The non-transitory computer-readable medium of claim 26, wherein the method further comprises identifying the eye region based on the masked image.

28. The non-transitory computer-readable medium of claim 26, wherein the method further comprises:
concatenating intensity values of pixels in the masked image to produce the feature vector;
normalizing the feature vector to produce a normalized feature vector; and
determining whether the face is gaze locking based on the normalized feature vector.

29. The non-transitory computer-readable medium of claim 21, wherein the method further comprises:
compressing the feature vector to generate a compressed feature vector; and
determining, based on the compressed feature vector, whether the face is gaze locking using a classifier.

30. The non-transitory computer-readable medium of claim 29, wherein the classifier is a binary classifier.

\* \* \* \* \*